United States Patent [19]
Drott

[11] Patent Number: 5,902,020
[45] Date of Patent: May 11, 1999

[54] HYDRAULIC BRAKE SYSTEM WITH SLIP CONTROL, IN PARTICULAR FOR MULTIPLE-AXLE AUTOMOTIVE VEHICLES

[75] Inventor: Peter Drott, Frankfurt am Main, Germany

[73] Assignee: ITT Automotive Europe GmbH, Germany

[21] Appl. No.: 08/696,928

[22] PCT Filed: Feb. 14, 1995

[86] PCT No.: PCT/EP95/00529

§ 371 Date: Aug. 22, 1996

§ 102(e) Date: Aug. 22, 1996

[87] PCT Pub. No.: WO95/23083

PCT Pub. Date: Aug. 31, 1995

[30] Foreign Application Priority Data

Feb. 23, 1994 [DE] Germany .............................. 44 05 672

[51] Int. Cl.⁶ ..................................................... B60T 8/94
[52] U.S. Cl. .................................. 303/122.09; 303/122.11
[58] Field of Search .......................... 303/122.09, 122.11, 303/122.12, 122.13, 116.2, DIG. 1, DIG. 2

[56] References Cited

U.S. PATENT DOCUMENTS 3,514,160   5/1970   Lieber ................................. 303/122.09
5,558,415   9/1996   Buschmann et al. .......... 303/122.09 X

FOREIGN PATENT DOCUMENTS

0485367A2   5/1992   European Pat. Off. .
1565110     4/1969   France .
1655457     7/1970   Germany .
3410006A1   9/1985   Germany .
3511579A1  10/1986   Germany .
3828931A1   3/1990   Germany .
4011329A1  10/1991   Germany .
4029793A1   3/1992   Germany .
4208581A1   5/1993   Germany .
1-90861     4/1989   Japan ................................ 303/122.11
2158901    11/1985   United Kingdom .
2191552    12/1987   United Kingdom .

*Primary Examiner*—Peter M. Poon
*Attorney, Agent, or Firm*—Rader, Fishman & Grauer PLLC

[57] ABSTRACT

The present invention relates to a hydraulic brake system with slip control, including a brake line which connects a braking pressure generator to several wheel brakes, at least one pressure modulation valve associated with each wheel brake to control the hydraulic connection to the wheel brake, a pump which supplies stored pressure fluid to the wheel brakes by way of a pressure fluid collecting means connected to a suction line, and sensors to determine the rotational speed of the wheels and an evaluating circuit to control the wheel slip. The pressure fluid connection between the braking pressure generator and the wheel brakes is established by a brake line, to which the pump is connected, wherein a multi-way valve and a monitoring device including a pressure sensor is inserted into the brake line to sense the pressure prevailing at the pressure modulation valve of the wheel brake.

10 Claims, 1 Drawing Sheet

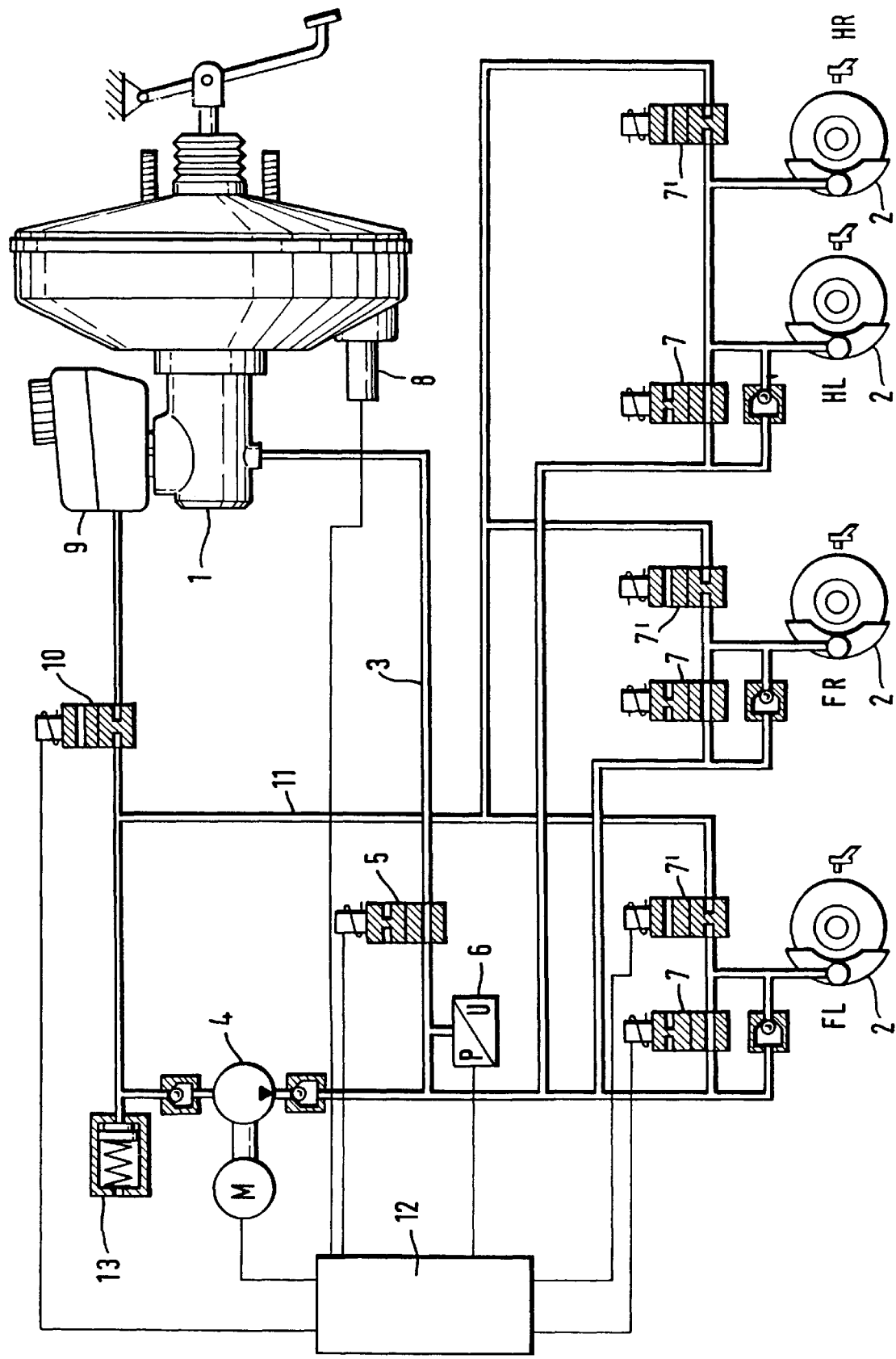

HYDRAULIC BRAKE SYSTEM WITH SLIP CONTROL, IN PARTICULAR FOR MULTIPLE-AXLE AUTOMOTIVE VEHICLES

FIELD OF THE INVENTION

The present invention relates to a hydraulic brake system with slip control, in particular for multiple-axle automotive vehicles employing a single brake circuit.

BACKGROUND OF THE INVENTION

Previously, hydraulic brake systems with slip control have exclusively been conceived as multi-circuit, preferably dual-circuit, brake systems. A satisfactory deceleration of the vehicle, which is in conformity with legal regulations for brake systems, is achieved due to the given redundance of brake circuits in the event of brake circuit leakage. In this respect, reference is made to the source of literature "BOSCH Technische Unterrichtung" (technical instructions), automotive vehicle brake systems, Robert Bosch GmbH, first edition of September 1989.

Although legal regulations for passenger vehicles in Europe and the U.S. so far do not mandate the provision of multiple circuits in brake systems, multiple circuit systems are the norm. A multiple-circuit brake system is relatively complicated and expensive, especially with respect to an application for anti-lock and/or traction slip control. Further, the complexity of such hydraulic brake systems with slip control involves a great number of possible malfunctions, which should not be underestimated. Such malfunctions are mainly due to leakages of the pump, the braking pressure generator and the pressure modulation valves.

SUMMARY OF THE INVENTION

An object of the present invention is to equip the previously known hydraulic brake system with slip control with a monitoring device which checks the brake system for leakage at component locations which are particularly susceptible to leakage, and, by detecting existing malfunctions of the brake system, enables a vehicle deceleration which satisfies legal regulations. Simple measures are employed for monitoring and for operation of the brake system.

According to the present invention, the pressure fluid connection between the braking pressure generator and all wheel brakes, for simplification of the construction, is established exclusively by a branched brake line, to which the pump is connected, and into which a multi-way valve and a monitoring device including a pressure sensor is inserted to sense the pressure prevailing at the pressure modulation valves of the wheel brakes. The proposed monitoring device permits the early detection of leakages, and a structurally simple and functionally reliable brake system is achieved by using only one brake circuit in conjunction with the monitoring device.

The features, advantages and possible applications of the present invention will be explained hereinbelow by making reference to the description of an embodiment as in FIG. 1.

BRIEF DESCRIPTION OF THE DRAWINGS

FIG. 1 shows the hydraulic and wiring schematic diagram of a slip-controlled brake system.

DETAILED DESCRIPTION OF A PREFERRED EMBODIMENT

Reference numeral 1 designates a braking pressure generator which includes a master cylinder to which a vacuum booster is flanged. A brake line 3 is connected to the master cylinder of braking pressure generator 1. Brake line 3 includes a multi-way valve 5 and has a pump 4 and pressure modulation valves 7,7' inserted into the pressure fluid branch lines of brake line 3. The pressure modulation valves 7,7' associated with wheel brakes 2 take the form of pressure modulation valves 7,7' associated with wheel brakes 2 take the form of two-way/two-position directional control valves in the proposed embodiment. Other switching variants such as three-way/two-position directional control valves or three-way/three-position directional control valves arc possible, as requested or needed, depending on the pressure gradient variation desired.

The wheel brakes 2 of the rear axle (HL and HR) are jointly controlled by way of a pair of pressure modulation valves 7,7', and the wheel brakes 2 of the front axle (FL and FR) are controlled individually on each wheel by way of corresponding pressure modulation valves 7,7'. Control channel split-up variants are possible but not the objective of the present invention.

A pressure sensor 6, part of the monitoring device, is arranged between the multi-way valve 5 in the brake line 3 and the pump connection to the wheel brakes 2. Reference numeral 10 designates a shut-off valve which, if required, connects a pressure fluid reservoir 9 fitted to the master cylinder to the suction side of the pump 4. During slip control operations, a pressure fluid return line 11 provides an unimpeded return flow of pressure fluid to the pump 4.

In the pressure reduction mode, the pressure fluid propagates to pressure fluid collecting means 13 associated with the pump 4 by way of the pressure modulation valve 7' that is electromagnetically switched to its open position. Reference numeral 8 designates a travel sensor which is fitted to the vacuum brake power booster, for example, to monitor the manual operation of the brake.

The travel sensor 8, the pressure sensor 6 as well as the multi-way valve 5 and the shut-off valve 10 are connected to an electronic evaluating circuit 12 which, preferably, is part of the electronic controller which is used for the slip control of the brake. The necessity of connecting the pressure modulation valves 7,7' and the wheel rotational speed sensors and the electric drive for the pump 4 to the evaluating circuit 12 in the electronic controller is not referred to explicitly, as it is well known in the art of brake system slip control.

Because the circuit-related design of the brake system of the present invention has now been described completely, the operation embodied by the invention will be referred to hereinbelow.

All valves adopt their switching position, as shown in the drawing, in the position of brake release and in the manually operated slip-free brake application position. This ensures an unimpeded pressure fluid connection between the braking pressure generator 1 and the wheel brakes 2. For a leakage test of the components connected to the braking pressure generator, in the position of brake release, the multi-way valve 5 is switched electromagnetically to a closed position by way of an actuating signal of the evaluating circuit 12 so that exclusively the pressure modulation valves 7,7', arranged downstream of the multi-way valve 5, and the pressure fluid paths connected thereto which lead to the wheel brakes and the pump 4 are monitored by the pressure sensor 6. Because the brake system initially remains unpressurized in the position of brake release, for a leakage test, the pump 4 is operated for a short time by an electric motor driven by the evaluating circuit 12 until a desired pressure level is achieved at pressure sensor 6 between the pump 4, the multi-way valve 5 and the connected wheel brakes 2. After the deactivation of the pump 4, the pressure sensor 6 will sense possible pressure variations in the wheel brake lines which are compared with the nominal data for performance characteristics for a predetermined period stored in evaluating circuit 12. If the data indicates an inadmissible pressure decline in the pressure fluid sensed in lines leading to the wheel brakes 2, a defined alternating closure of the pressure modulation valves 7 of individual wheel brakes permits detecting the pressure fluid path where leakage occurred.

To track down the source of leakage with respect to losses due to leakage on the side of wheel brakes or valves, the source of leakage is precisely localized in another testing step by blocking the leaking pressure fluid path using the initially still open individual pressure modulation valves 7. Discontinuity or reduction of the pressure decline, even a slight pressure decline attributable to the closing action would be considered an indication of a leaking wheel brake cylinder.

Both the leakage test related to the wheel brake groups and the individual leakage test for each wheel brake preconditions a corresponding testing pressure level in the brake line 3 so that the necessary testing pressure must be monitored, or the testing step must be interrupted, if necessary, during each individual period of testing by way of the pressure sensor 6 and the evaluating circuit 12, in order to develop the required testing pressure in the brake line 3 by way of pump 4 after a short-time operation.

However, the proposed circuit configuration does not limit the monitoring function to the position of brake release. In conjunction with the normal braking position initiated proportionally to pedal force, detection of continuing leakages is possible during every braking operation. During operation of the braking pressure generator 1, signals corresponding to pedal movement are supplied to the evaluating circuit 12 by way of the travel sensor 8 fitted to the braking pressure generator 1. Because the multi-way valve 5 is in the electromagnetically non-energized, normally open position during brake application, braking pressure, which is introduced proportionally to pedal force, propagates through the brake line 3 to the pressure modulation valves 7, which are open in their basic position, and, thus, to the wheel brakes 2. The pump 4 is in its off position so that the pressure sensor 6 exclusively senses the pressure introduced proportionally to pedal force which, as an electric signal, is conducted to the evaluating circuit 12. Because the pressure variation in the brake circuit and the travel variation at the braking pressure generator 1 adopt a certain ratio, a continuous comparison is performed in the evaluating circuit 12 between the input signal supplied by the pressure sensor 6 and the input signals from the travel sensor 8.

When unpermittably large changes in the pressure to travel relationship are identified by the evaluating circuit 12, partial deactivation of the brake system occurs. To this end, either the braking pressure generator 1 or the defective wheel brake connection is shut off by way of the multi-way valve 5 or by way of the pressure modulation valve 7 associated with the defective wheel brake 2. In the first-mentioned case, i.e. when the braking pressure generator 1 failed, braking is effected exclusively by operation of the pump 4 which is monitored by the pressure sensor 6 and, in case of need, can also be controlled by using the data from the pressure sensor 6. The circuit-related interaction with the travel sensor 8 ensures a continuous monitoring of the desired and manually activated operation of the braking pressure generator 1 which, as a priority signal, can be made the basis for pump control upon failure of the braking pressure generator 1.

Then, in the case of failure of the braking pressure generator, the pump 4 will take in fluid from the supply reservoir 9 of the master cylinder exclusively through the opened shut-off valve 10. However, as long as the braking pressure generator 1 is operable, pressure is supplied by the master cylinder. During slip control, pressure supply is rather by way of the fluid volume stored in the pressure fluid collecting means 13 which is replenished through the return line when the pressure modulation valves 7' open.

If leakage is due to a defective wheel brake 2, however, the leaking wheel brake 2 must be detected by a defined alternating deactivation of individual brake line paths by way of the pressure modulation valves 7, and must be closed permanently by the pressure modulation valve 7.

The present invention provides a slip-controlled one-circuit brake system including the previously described features which permits reducing by half the structural expenditure of the pump 4, the brake line and the master cylinder of the braking pressure generator 1 and performing a leakage test of the individual imminently leaking assembly groups, in the position of brake release and in the position of brake application, by the appropriate arrangement of pressure sensor 6 and multi-way valve 5 and shut-off valve 10. Thereby, occurring leakages can be recognized at an early stage so that an increased loss in fluid is prevented by a partial deactivation of the brake system, if necessary. A one-circuit brake system is achieved which remains operable by taking in consideration leakages which possibly occur in practical operations.

I claim:

1. A hydraulic brake system with slip control for multiple axle vehicles, the brake system comprising:

a braking pressure generator;

a plurality of wheel brakes;

a single circuit brake line connecting to the braking pressure generator at a single location and having individual fluid pressure lines extending therefrom to each of the wheel brakes;

an electrically actuated primary pressure modulation valve in each of the individual fluid pressure lines associated with each wheel brake with the primary pressure valve controlling the hydraulic connection between the braking pressure generator and the associated wheel brake;

a pump having a suction side connected by a suction line to a pressure fluid reservoir associated with the braking pressure generator and the pump also having a pressure side connected to the brake line;

an accumulator disposed along the suction line between the suction side of the pump and the pressure fluid reservoir;

a multi-way valve in the brake line between the pump and the braking pressure generator;

a pressure sensor connecting to the brake line on the pressure side of the pump and on a side of the multi-way valve opposite the braking pressure generator;

a shut-off valve in the fluid pressure line between the accumulator and the pressure fluid reservoir; and an evaluating circuit electrically connected to the pressure modulation valves and to the pressure sensor with the evaluating circuit being configured to selectively actuate each pressure modulation valve and the shut-off valve responsive to a signal from the pressure sensor wherein vehicle brake operation is maintained in the event of a fluid leak.

2. A hydraulic brake system as claimed in claim 1, wherein a travel sensor is fitted to the braking pressure generator and is electrically connected to the evaluating circuit to enable the evaluating circuit to electrically monitor manual operation of the brake.

3. A hydraulic brake system as claimed in claim 2, wherein the evaluating circuit includes means for maintaining the multi-way valve in an open position thereby exposing the pressure sensor to a hydraulic pressure of the braking pressure generator and means for comparing a voltage signal of the travel sensor to a voltage signal of the pressure sensor.

4. A hydraulic brake system as claimed in claim 3, wherein the evaluating circuit includes means for sensing a variation of the voltage signal of the travel sensor with respect to the voltage signal of the pressure sensor for determining if there is a leak, and the evaluating circuit also includes means for deactivating part of the brake system for preventing additional pressure fluid loss.

5. A hydraulic brake system as claimed in claim 4, wherein the evaluating circuit also includes means for alternating closure of the primary pressure modulation valves while keeping the other primary pressure modulation valves open, and means for determining an increase in hydraulic pressure as a function of closing of a one of the primary pressure modulation valves and means for maintaining the one of the primary pressure modulation valves closed, thereby disabling an associated wheel brake and limiting pressure fluid loss.

6. A hydraulic brake system as claimed in claim 4, wherein the evaluating circuit also includes means for closing the multi-way valve and energizing the pump and monitoring the pressure signal to determine if there has been no pressure decrease with the multi-way valve closed, thereby indicating the braking pressure generator is a source of leakage, and further including means for maintaining the multi-way valve closed when there is no pressure decrease and means for energizing the pump responsive to displacement of the travel sensor with braking pressure being generated exclusively by the pump.

7. A hydraulic brake system as claimed in claim 1, wherein a pressure fluid return line is connected to the suction line and the pressure fluid return line has individual wheel portions connected to each of the wheel brakes and secondary pressure modulation valves are in the individual wheel portions of the suction line.

8. A hydraulic brake system as claimed in claim 1, wherein the evaluating circuit includes means for selectively closing the multi-way valve in the brake line and means for selectively energizing the pump to develop a defined pressure level as indicated by a pressure signal from the pressure sensor and means for subsequently deactivating the pump.

9. A hydraulic brake system as claimed in claim 8, wherein the evaluating circuit includes means for storing a nominal value of pressure and means for monitoring the pressure signal from the pressure sensor for a defined period of time after deactivating the pump and means for comparing the pressure signal with the nominal value of pressure with an unacceptably large decay in the pressure signal being indicative of a leak in the hydraulic brake system.

10. A hydraulic brake system as claimed in claim 1, wherein the evaluating circuit includes means for selectively closing each of the primary pressure modulation valves individually when the other primary pressure modulation valves are open to enable the identification of a leaking wheel brake.

* * * * *